US 9,467,295 B2

(12) United States Patent
Zong et al.

(10) Patent No.: US 9,467,295 B2
(45) Date of Patent: Oct. 11, 2016

(54) HNB OR HENB SECURITY ACCESS METHOD AND SYSTEM, AND CORE NETWORK ELEMENT

(71) Applicant: ZTE CORPORATION, Shenzhen, Guangdong (CN)

(72) Inventors: Zaifeng Zong, Shenzhen (CN); Xiaoyun Zhou, Shenzhen (CN); Li Zhu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 224 days.

(21) Appl. No.: 14/355,299

(22) PCT Filed: Oct. 8, 2012

(86) PCT No.: PCT/CN2012/082555
§ 371 (c)(1),
(2) Date: Apr. 30, 2014

(87) PCT Pub. No.: WO2013/064002
PCT Pub. Date: May 10, 2013

(65) Prior Publication Data
US 2014/0310529 A1    Oct. 16, 2014

(30) Foreign Application Priority Data

Oct. 31, 2011   (CN) .......................... 2011 1 0337762
Nov. 4, 2011    (CN) .......................... 2011 1 0364549

(51) Int. Cl.
*H04L 9/32*     (2006.01)
*H04W 12/06*    (2009.01)
(Continued)

(52) U.S. Cl.
CPC ............ *H04L 9/3247* (2013.01); *H04W 12/06* (2013.01); *H04W 12/12* (2013.01); *H04W 88/08* (2013.01)

(58) Field of Classification Search
CPC ...... H04L 9/32; H04L 9/3247; H04W 12/06; H04W 12/12; H04W 88/08
See application file for complete search history.

(56) References Cited

U.S. PATENT DOCUMENTS 8,509,431 B2 *   8/2013   Schmidt ............... H04L 63/061
                                                         380/44
8,533,803 B2 *   9/2013   Cha ........................ G06F 21/34
                                                         726/7
(Continued)

FOREIGN PATENT DOCUMENTS

CN        101442402        5/2009
CN        101715177        5/2010
(Continued)

OTHER PUBLICATIONS

3GPP TSG SA WG3 (Security) Meetimng No. 65, S3-111053, Source ZTE, Dated Nov. 7-11, 2011, "A solution to solve the Security gap for H9e)Nb."

(Continued)

*Primary Examiner* — David Garcia Cervetti
*Assistant Examiner* — Khoi Le
(74) *Attorney, Agent, or Firm* — Brooks Kushman P.C.

(57) ABSTRACT

A Home (Evolved) NodeB (H(e)NB) security access method and system, and a core network element are disclosed. The method includes a security gateway (SeGW) signing a digital signature for identity information of an H(e)NB and sending the digital signature to the H(e)NB, the H(e)NB sending the identity information of the H(e)NB and the digital signature to the core network element, and the core network element performing a correctness verification on the identity information of the H(e)NB and the digital signature.

15 Claims, 5 Drawing Sheets

(51) Int. Cl.
*H04W 12/12* (2009.01)
*H04W 88/08* (2009.01)

(56) References Cited

U.S. PATENT DOCUMENTS

| | | | | |
|---|---|---|---|---|
| 8,886,164 | B2* | 11/2014 | Palanigounder | H04L 63/0823 370/312 |
| 2009/0182618 | A1* | 7/2009 | Higgins | G06Q 30/02 705/14.4 |
| 2010/0095368 | A1* | 4/2010 | Niu | H04W 12/06 726/12 |
| 2011/0041003 | A1* | 2/2011 | Pattar | H04W 12/10 714/4.3 |
| 2013/0007858 | A1* | 1/2013 | Shah | H04L 63/0815 726/6 |

FOREIGN PATENT DOCUMENTS

| | | |
|---|---|---|
| CN | 101784051 | 7/2010 |
| CN | 101795451 | 8/2010 |
| JP | 2010206702 | 9/2010 |
| WO | 2010062983 | 6/2010 |
| WO | 2010102222 | 9/2010 |

OTHER PUBLICATIONS

Aldatel-Lucent, Alcatel-Lucent Shanghai Bell, Binding of HNB identities for CSG Verification, VODAFONE, AT&T, 3GPP TSG SA WG3 (Security) meeting #64, Mainz, Germany, Jul. 11-15, 2011.
Alcatel-Lucent, Reply to SA3 LS on CSG security for H(e)NB, 3GPP TSG RAN WG3 Meeting #72, Barcelona, Spain May 9-13, 2011.
LTE Advanced, 3rd Generation Partnership Project; 3GPP TS 33.320 V11.3.0, Technical Specification Group Services and System Aspects; Security of Home Node B (HNB)/Home evolved NOde B (HeNB), (Release 11), Sep. 2011.
European Patent Office, Extended Search Report for corresponding European Patent Application No. 12844878.4 mailed Mar. 17, 2015.
International Search Report for PCT/CN2012/082555, English translation attached to original, Both completed by the Chinese Patent Office on Dec. 25, 2012, All together 5 Pages.

* cited by examiner

HNB OR HENB SECURITY ACCESS METHOD AND SYSTEM, AND CORE NETWORK ELEMENT

CROSS-REFERENCE TO RELATED APPLICATION

This application is the U.S. national phase of PCT Appln. No. PCT/CN2012/082555 filed Oct. 8, 2012 which claims priority to Chinese Application No. 201110337762.7 filed Oct. 31, 2011 and Chinese Application No. 201110364549.5 filed Nov. 4, 2011, the disclosures of which are incorporated in their entirety by reference herein.

TECHNICAL FIELD

The present document relates to Home (evolved) NodeB (H(e)NB) security access technology, and in particular, to an H(e)NB security access method and system, and a core network element.

BACKGROUND OF THE RELATED ART

The Evolved Packet System (EPS) provided by the 3rd Generation Partnership Project (3GPP) is composed of the Evolved Universal Terrestrial Radio Access Network (E-UTRAN), the Mobility Management Entity (MME), the Serving Gateway (S-GW), the Packet Data Network Gateway (P-GW, or PDN GW), the Home Subscriber Server (HSS) and the Authentication, Authorization and Accounting (AAA) server.

When an H(e)NB accesses the Evolved Packet Core (EPC), in order to guarantee the security, the security gateway (SeGW) is introduced in the evolved core network, and the H(e)NB establishes an IPSec tunnel with the security gateway at first before communicating with the equipment of the core network. The control plane communication data and the user plane data between the H(e)NB and the equipment of the core network are all encrypted by that IPSec tunnel. FIG. 1 is a system framework diagram of an H(e)NB accessing the core network. As shown in FIG. 1, this framework supports the traditional GERAN/UTRAN and the Long Term Evolution (LTE) access simultaneously; wherein, the Home NodeB (HNB) is a home base station supporting the GERAN/UTRAN, and the Home eNodeB (HeNB) is a home base station supporting the LTE. The home base station gateway (Home NodeB Gateway, HNB GW) is mandatory when the HNB is adopted to access. The HNB needs to register with the HNB GW when the HNB is power-on. The evolved home base station gateway (Home eNodeB Gateway, HeNB GW) is optional. When the HeNB GW is deployed, the HeNB registers with the HeNB GW; when the HeNB GW is not deployed, the HeNB is registered to the MME.

According to the 3GPP protocol, when the UE accesses from the H(e)NB (that is, HNB or HeNB), the MME or the Serving GPRS SUPPORT NODESGSN (SGSN) or the HNB GW performs the access control on the UE. When the UE attaches through the H(e)NB, if the UE and the network support the Closed Subscribe Group (CSG), the H(e)NB notifies the CSG identity (CSG ID) supported by itself to the SGSN or the MME. The SGSN or the MME judges whether to allow that user to access from that H(e)NB according to the user subscription data obtained from the HSS. When the UE attaches through the HNB, and if the UE or the network does not support the CSG, the HNB GW judges whether to allow that UE to access from that HNB according to the UE IMSI list allowed by the HNB and configured locally.

In the above-mentioned process that the UE accesses through the H(e)NB, all relevant messages are all protected by the security tunnel between the H(e)NB and the SeGW. The H(e)NB establishes the security tunnel with the SeGW and authenticated with each other when power-on, therefore, the H(e)NB is believable from the viewpoint of the SeGW. However, the relevant protocol is unable to guarantee that the identity sent to the MME/SGSN/HNB GW by the H(e)NB is the same with the identity during the mutual-authentication with the SeGW. In fact, in a lot of scenes, the H(e)NB uses the identity in the MME/SGSN/HNB GW, which is different from the one during the mutual-authentication with the SeGW. According to the current protocol, the SeGW is not responsible for the authentication of the identity used by the H(e)NB in the MME/SGSN/HNB GW.

Therefore, according to the relevant protocol, the H(e)NB can illegally use other's identity subsequently when communicating with the MME/SGSN/H(e)NB GW. For example, the HeNB1 uses the true identity (this identity is based on the certificate or based on the hosting party module (HPM)) to establish the IPSec tunnel and mutual-authenticate with the SeGW first; when the UE accesses from the HeNB1, the HeNB1 sends the HeNB ID of the HeNB2 and the CSG ID supported by the HeNB2 to the MME. According to the CSG ID of the HeNB2, the access of the UE is allowable; however, the access of the UE will not be allowable if it is based on the CSG ID supported by the HeNB1. In the above-mentioned example, the HeNB1 illegally uses other's identity, thus enabling the user, who is originally not allowed to access, to be able to access the network, thus destroying the security of the network.

To that problem, someone proposes a method that a new interface is added between the SeGW and the MME/H(e)NB GW and the SeGW sends the association relationship between the H(e)NB ID and the inner IP address of the H(e)NB to the MME/H(e)NB GW, to authenticate the identity of the H(e)NB in the core network (that is, the identity used in the MME/H(e)NB GW). However, this method has a lot of defects, specifically including that: the association relationship between the H(e)NB ID and the inner IP address of the H(e)NB can only be triggered by the IPSec message to send to the MME//H(e)NB GW when the H(e)NB is power-on, and the SeGW needs to select an appropriate MME//H(e)NB GW to send that association relationship, and needs to guarantee that the H(e)NB selects the same MME or H(e)NB GW when the H(e)NB is registered, therefore, it needs to guarantee that the H(e)NB selects the same MME or H(e)NB GW during the specific implementation, which will undoubtedly increase the difficulty of realization. And, if the H(e)NB does not select to send the MME or H(e)NB GW of its own identity when it is power-on originally, this method will be failed. According to the relevant protocol, the H(e)NB selects the MME or H(e)NB GW according to the configuration information of the H(e)MS, but there is no interface between the SeGW and the H(e)MS, so it is very difficult to guarantee that the MME and the H(e)NB GW selected by the SeGW are the same as the H(e)NB and the MME selected by the H(e)NB GW. And, in this scheme, it is assumed that the MME and the H(e)NB GW is the authentication server of the H(e)NB, however, according to the relevant protocol, the authentication based on the HPM module is optional, therefore, the authentication of the H(e)NB may not need to be applied to the AAA server, which makes that scheme unable to be suitable for all scenes.

SUMMARY OF THE INVENTION

Given all that, the main purpose of embodiments of the present document is to provide a Home (evolved) NodeB (H(e)NB) security access method and system, which can avoid that an illegal H(e)NB pretends to be a legal H(e)NB to access the core network and to provide services for the user equipment.

To achieve the above purpose, the technical solution of the embodiments of the present document is realized as follows.

A Home (evolved) NodeB (H(e)NB) security access method comprises:

a security gateway (SeGW) signing the identity information of the H(e)NB, and sending the digital signature of the H(e)NB to the H(e)NB;

the H(e)NB sending the digital signature and the identity information of the H(e)NB to a core network element;

the core network element performing a correctness verification on the digital signature and the identity information of the H(e)NB.

Preferably, the step of a security gateway (SeGW) signing a digital signature for identity information of the H(e)NB comprises:

the SeGW, when performing an identity authentication on the H(e)NB, obtaining the identity information of the H(e)NB, and signing the digital signature for the identity information of the H(e)NB.

Preferably, the step of the H(e)NB sending the identity information of the H(e)NB to a core network element comprises:

when the H(e)NB registers, the H(e)NB sending the digital signature and the identity information of the H(e)NB to the core network element.

Preferably, the step of the H(e)NB sending the digital signature and the identity information of the H(e)NB to a core network element comprises:

when a user equipment (UE) registers via the H(e)NB, the H(e)NB sending the digital signature and the identity information of the H(e)NB to the core network element.

Preferably, the SeGW uses a private key of the SeGW to sign the digital signature for the identity information of the H(e)NB;

correspondingly, the core network element performs the correctness verification on the digital signature and the identity information of the H(e)NB through a public key of the SeGW.

Preferably, the SeGW uses a dynamic session key to sign the digital signature for the identity information of the H(e)NB; and the method further comprises: the SeGW notifying a home subscriber server (HSS)/Authentication, Authorization and Accounting (AAA) server of the dynamic session key, and the HSS/AAA server storing the dynamic session key.

Preferably, the step of the core network element performing a correctness verification on the digital signature and the identity information of the H(e)NB comprises:

the core network element obtaining, from the AAA/HSS, the dynamic session key for signature for the identity information of the H(e)NB, and performing the verification on the identity information of the H(e)NB using the dynamic session key.

Preferably, the identity information of the H(e)NB is an H(e)NB ID and an inner IP address of the H(e)NB, or is a Closed Subscribe Group (CSG) ID and an inner IP address of the H(e)NB, or is an H(e)NB ID, a CSG ID and an inner IP address of the H(e)NB.

Preferably, the method further comprises:

after the verification for the H(e)NB information and the digital signature by the core network element is successful, the core network element storing the H(e)NB information.

Preferably, the core network element is an H(e)NB GW or a Mobility Management Entity (MME).

Preferably, the core network element is an MME, a Serving GPRS Support Node (SGSN) or a Mobile Switching Center (MSC).

Preferably, when the UE accesses through the H(e)NB, after the core network element verifies that the identity information of the H(e)NB is correct, the core network element sends the identity information of the H(e)NB to the MME or SGSN or MSC, and the MME or the SGSN or the MSC obtains the CSG ID information supported by the H(e)NB and performs an access control on the UE according to the CSG ID information; wherein, the MME or the SGSN or the MSC obtains the CSG ID information from the H(e)NB information, or obtains the CSG ID information from the HSS/AAA server.

Preferably, when the UE accesses through the H(e)NB, after the core network element verifies that the identity information of the H(e)NB is correct, the core network element obtains the CSG ID information supported by the H(e)NB, and performs an access control on the UE according to the CSG ID information; wherein, the core network element obtains the CSG ID information from the H(e)NB information, or obtains the CSG ID information from the HSS/AAA server.

Preferably, the core network element obtains the public key of the SeGW from a configured certificate of the SeGW, or the core network element obtains the public key of the SeGW from a certificate sent from the H(e)NB to the core network element.

Preferably, the SeGW sends the digital signature to the H(e)NB by extending a configuration payload (CP) of IKEv2.

Preferably, the SeGW sends the identity information of the H(e)NB to the H(e)NB by extending a configuration payload (CP) of IKEv2.

A Home (evolved) NodeB (H(e)NB) security access method comprises:

when an H(e)NB registers with a core network element, the core network element obtaining identity information of the H(e)NB through a communication interface configured between the core network element and a security gateway (SeGW), performing a correctness verification on the identity information reported by the H(e)NB, and after the verification is passed, accepting the registration of the H(e)NB.

Preferably, the core network element is an H(e)NB GW; when the H(e)NB GW is not configured, the core network element is a Mobility Management Entity (MME).

A Home (evolved) NodeB (H(e)NB) security access system comprises a security gateway (SeGW) and a core network element; wherein, the SeGW is configured to: sign the identity information of the H(e)NB, and send the digital signature along with the identity information of the H(e)NB to the H(e)NB;

the core network element is configured to: receive the identity information and the digital signature sent by the H(e)NB, and perform a correctness verification on the digital signature and the identity information of the H(e)NB.

Preferably, the SeGW is configured to use a private key of the SeGW to sign the digital signature for the identity information of the H(e)NB;

correspondingly, the core network element is configured to perform the correctness verification on the digital signature and the identity information of the H(e)NB through a public key of the SeGW.

Preferably, the SeGW is configured to use a dynamic session key to sign the digital signature for the identity information of the H(e)NB; and notify a home subscriber server (HSS)/Authentication, Authorization and Accounting (AAA) server of the dynamic session key.

Preferably, the core network element is configured to: obtain, from the AAA/HSS, a dynamic session key for the digital signature for the identity information of the H(e)NB, and verify the identity information of the H(e)NB using the dynamic session key.

Preferably, the identity information of the H(e)NB is an H(e)NB ID and an inner IP address of the H(e)NB, or is a Closed Subscriber Group (CSG) ID and an inner IP address of the H(e)NB, or is an H(e)NB ID, a CSG ID and an inner IP address of the H(e)NB; and the core network element is a Mobility Management Entity (MME), a Serving GPRS Support Node (SGSN) or an H(e)NB GW.

Preferably, the SeGW is configured to send the identity information of the H(e)NB to the H(e)NB.

A core network element, is configured to:

receive identity information sent by a Home (evolved) NodeB (H(e)NB) and a digital signature signed for the identity information by a security gateway (SeGW), and perform a correctness verification on the identity information and the digital signature.

A core network element, is configured to:

obtain identity information of a Home (evolved) NodeB (H(e)NB) performing identity authentication through a communication interface between the core network element and a security gateway (SeGW), perform a correctness verification on the identity information reported by the H(e)NB, and after the verification is passed, accept a registration of the H(e)NB.

The solution of the embodiments of the present document avoids that an illegal H(e)NB registers with the core network element directly and realizes accessing to the services of the UE, thereby maintaining network security.

PREFERRED EMBODIMENTS OF THE INVENTION

In the embodiments of the present document, a security gateway (SeGW) will sign a digital signature for identity information of a Home (Evolved) NodeB (H(e)NB) when the SeGW performs the identify authentication on the H(e)NB, and send the digital signature to the H(e)NB; the H(e)NB sends its own identity information and the digital signature to a core network element when UE attaches or a tracking area is updated or a routing is updated; and the core network element performs the correctness verification on the identity information and the digital signature of the H(e)NB, and performs the access control on the UE after the verification is passed. Or, a communication interface is set between the SeGW and the core network element, the core network element obtains the identity information of the H(e)NB from the SeGW when receiving a registration request from the H(e)NB, and performs the identity authentication on the H(e)NB which requests for the registration.

Embodiment One

Figure 1:
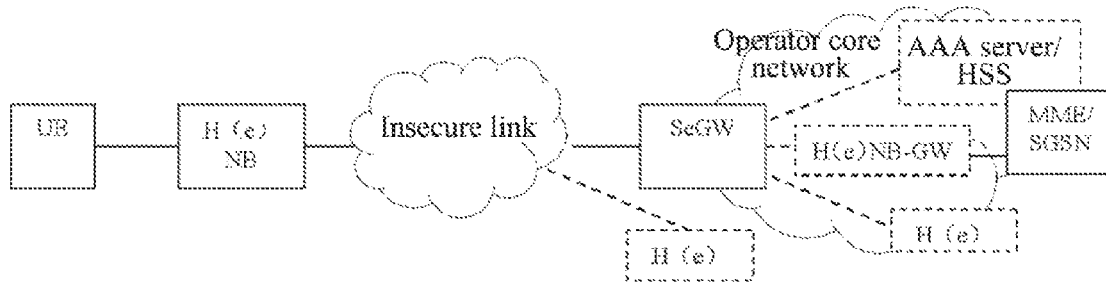
FIG. 1 is a system framework diagram of an H(e)NB accessing a core network.
Figure 2:
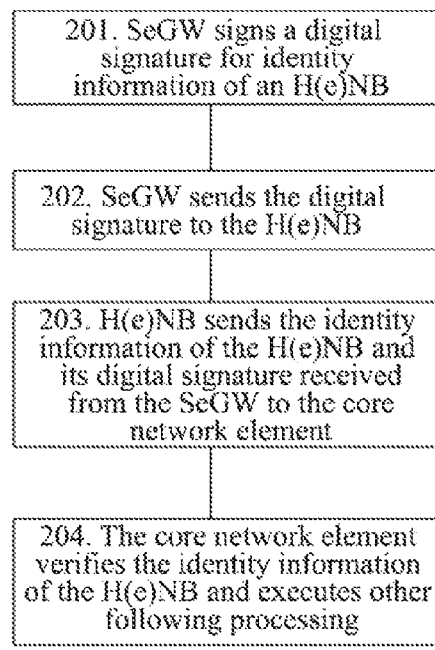
FIG. 2 is a flow chart of a Home (Evolved) NodeB (H(e)NB) security access method according to embodiment one of the present document.

FIG. 2 is a flow chart of a H(e)NB security access method according to embodiment one of the present document; because the H(e)NB may be attacked, the core network cannot believe the identity provided by the H(e)NB itself. Considering that the SeGW is a dependable security entity, therefore, the present document considers that the SeGW signs a digital signature for the H(e)NB identity, and sends that digital signature to the H(e)NB. The H(e)NB sends the digital signature signed by the SeGW and the identity information to the core network element to perform the identity authentication. As shown in FIG. 2, the H(e)NB security access method of the example includes the following steps.

In step 201, the SeGW signs a digital signature for the identity information of the H(e)NB.

The identity information of the H(e)NB includes an H(e)NB ID, and/or a CSG ID, and/or other identities. In order to verify that the identity information of the H(e)NB with the digital signature is really sent by the SeGW to a certain H(e)NB, the SeGW includes an inner IP address of the H(e)NB in that identity information of the H(e)NB. The inner IP address of the H(e)NB is an IP address assigned to the H(e)NB by the SeGW when an IPSec tunnel is established. The H(e)NB adopts that inner IP address to communicate with the core network element, and that inner IP address is included in a header of an inner IP packet of the IPSec tunnel message.

The SeGW can sign the digital signature for the identity information of the H(e)NB using a private key of the SeGW, and also can sign the digital signature for the identity information of the H(e)NB using a session key for the identity information of the H(e)NB.

In step 202, the SeGW sends the digital signature to the H(e)NB, and also can send the identity information to the H(e)NB.

In step 203, the H(e)NB sends the above-mentioned digital signature and the identity information of the H(e)NB to the core network element (that is, H(e)NB GW, MME or SGSN). The H(e)NB can send the above-mentioned information while registering or send the above-mentioned information together with the UE relevant message when the UE accesses. When sending the above-mentioned information while registering, that information will be sent to the H(e)NB GW, and if the H(e)NB GW is not deployed, then it is sent to the MME; when it is sent together with the UE relevant message when the UE accesses, that information will be sent to the MME (for EUTRAN) or SGSN (for UTRAN or GERAN) or MSC.

In step 204, the core network element verifies the digital signature for the identity information of the H(e)NB.

When the SeGW signs the digital signature for the identity information of the H(e)NB using the private key, the core network element (that is, MME, SGSN or H(e)NB GW) verifies the digital signature using a public key of the SeGW. When the SeGW signs the digital signature for the identity information of the H(e)NB using the session key, the core network element needs to use the same session key to verify the digital signature.

In the present embodiment, there are two different verification ways according to different locations for verifying the identity information of the H(e)NB, respectively: verifying the identity information of the H(e)NB when the H(e)NB registers; or, verifying the identity of the H(e)NB when the UE accesses.

If the identity information of the H(e)NB is verified when the H(e)NB registers, then the entity which verifies the H(e)NB identity will be the H(e)NB GW or the MME (when the H(e)NB GW is not deployed). Because there is no interface between the H(e)NB GW and the AAA/HSS, that scheme is suitable for using the digital signature mode based on the public and private key.

If the identity information of the H(e)NB is verified when the UE accesses, then the entity which verifies the H(e)NB identity is the MME (for EUTRAN) or SGSN (for GERAN/UTRAN). That scheme can adopt the digital signature mode based on the public and private key, or the digital signature mode based on a dynamic session key.

The above-mentioned method is further described by combining with the specific procedures hereinafter.

Embodiment Two

Figure 3:
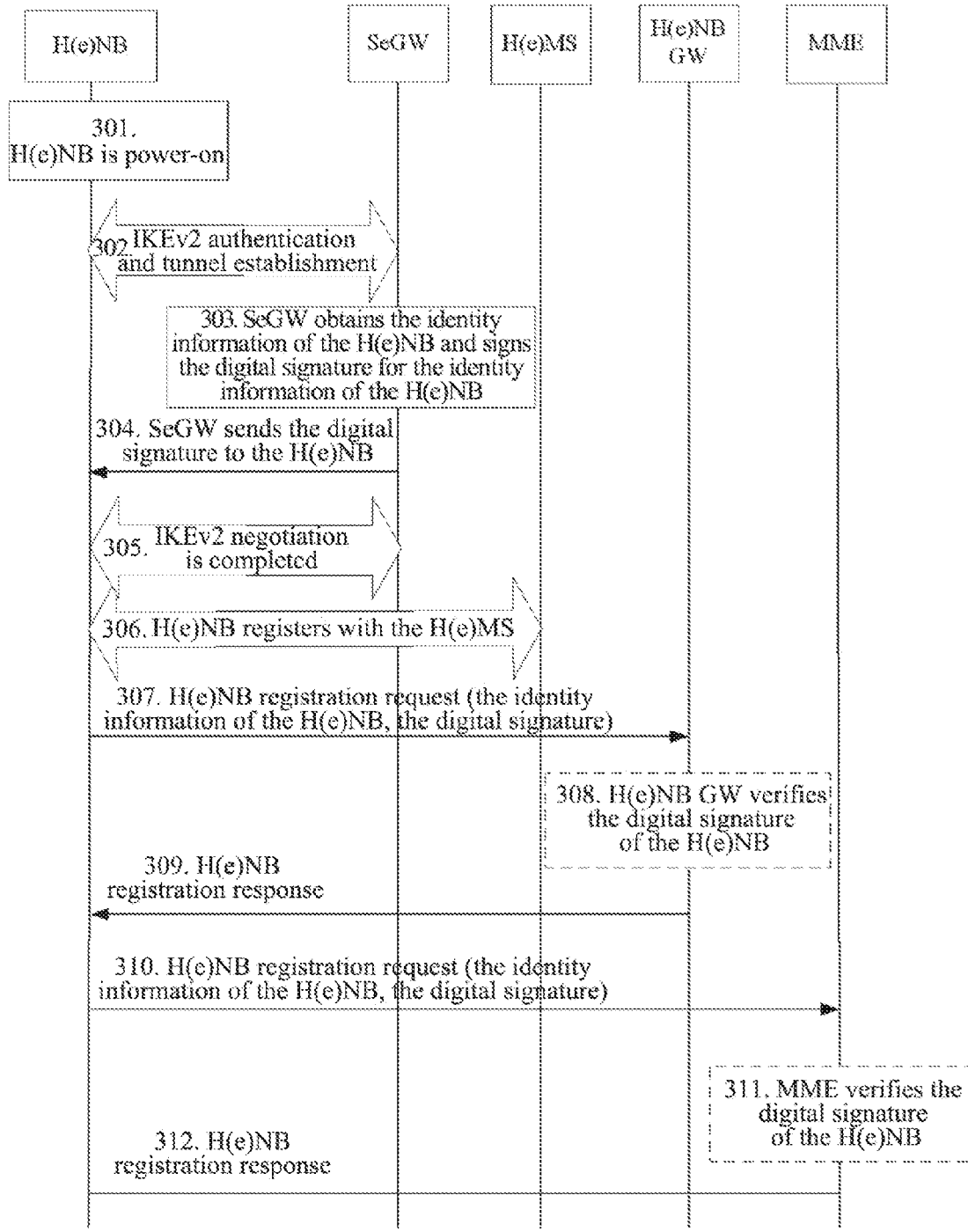
FIG. 3 is a flow chart of a Home (Evolved) NodeB (H(e)NB) security access method according to embodiment two of the present document.

FIG. 3 is a flow chart of a H(e)NB security access method according to embodiment two of the present document. The example is a method for the H(e)NB GW or the MME to verify the digital signature of the identify information of the H(e)NB when the H(e)NB registers. As shown in FIG. 3, the H(e)NB security access method of the example includes the following steps.

In step 301, the H(e)NB is power-on. The H(e)NB accesses the local network, and obtains the IP address configuration information from the local network.

In step 302, the H(e)NB initiates an IKEv2 negotiation with the SeGW. That process includes mutual-authentication of the H(e)NB and the SeGW, negotiation of the security association, the SeGW allocating the inner IP address for the H(e)NB, etc.

In step 303, the SeGW obtains the identity information of the H(e)NB used for the core network communication, and that information includes H(e)NB ID, and/or CSG ID, etc. The SeGW signs the identity information of the H(e)NB, and the specific digital signature algorithm is as follows:

$$X=\text{Algorithm 1 (the identity information of the H(e)NB|the IP address of the H(e)NB)} \quad [A].$$

In the formula [A], "|" stands for cascading the information. When the identity information of the H(e)NB includes a plurality of pieces of information, the SeGW cascades a plurality of pieces of information, that is, connecting a plurality of pieces of information in sequence. For example, when the identity information is the H(e)NB ID and the CSG ID, the identity information of the H(e)NB in the above-mentioned formula is H(e)NB ID|CSG ID.

Algorithm 1 is an unidirectional hashing algorithm, and the present document does not stipulate the specific algorithm. The objective of the algorithmic is to convert a long character string to the length suitable for the digital signature algorithm. As the example, a simple unidirectional hashing algorithm is the MD5 algorithm.

$$\text{Digital signature=Digital signature algorithm}(X, \text{digital signature key}) \quad [B].$$

The present document does not stipulate the specific digital signature algorithm, the digital signature algorithm can refer to any digital signature algorithm in the related art; for example, a common RSA algorithm can be used as the digital signature algorithm of the present document.

In the present example, the digital signature key is a private key of the SeGW.

In step 304, the SeGW sends the digital signature to the H(e)NB; alternatively, the SeGW can send the identity information of the H(e)NB together to the H(e)NB as well. If the identity information of the H(e)NB (such as CSG ID, H(e)NB ID) is not sent to the H(e)NB through the SeGW, the H(e)NB can obtain it from the H(e)MS or fixedly configure it on the H(e)NB. If the H(e)NB requires to be assigned with an IP address, the SeGW also sends the IP address to the H(e)NB. The digital signature and the identity information of the H(e)NB can be sent by extending the IKEv2 protocol, for example, the Configuration Payload (CP) of the IKEv2 can be extended, to put the digital signature and the identity information of the H(e)NB into the Configuration Payload to send to the H(e)NB.

In step 305, the IKEv2 negotiation is completed. An IPSec security tunnel is established between the H(e)NB and the SeGW.

In step 306, the H(e)NB obtains the configuration parameter from the H(e)MS.

In step 307, when the network deploys the H(e)NB GW, the H(e)NB sends a registration request message to the H(e)NB GW, and the H(e)NB sends the identity information of the H(e)NB and its digital signature to the H(e)NB GW in that message.

In step 308, the H(e)NB GW verifies the digital signature and the identity information of the H(e)NB. The verification method is as follows:

the H(e)NB GW decrypts the digital signature according to the following formula:

$$Y=\text{Decryption algorithm(digital signature,Decryption key)}.$$

The Decryption algorithm is corresponding to the encryption algorithm, which can refer to the current Decryption algorithm, such as RSA Decryption algorithm, etc.

The digital signature in the above-mentioned formula is the digital signature of the identity information of the H(e)NB sent by the H(e)NB to the H(e)NB GW. The Decryption key in the present example is the public key of the SeGW.

The H(e)NB GW calculates X' according to the following formula:

$$X'=\text{Algorithm 1 (The identity information of the H(e)NB|the IP address of the H(e)NB).} \quad [C]$$

The identity information of the H(e)NB is the identity information of the H(e) NB sent by the H(e)NB to the H(e)NB GW in step 307; the IP address of the H(e)NB is the source IP address of the registration request message sent by the H(e)NB to the H(e)NB GW in step 307.

If Y=X', then the digital signature verification is successful; otherwise, the digital signature verification is failed.

The H(e)NB GW obtains the public key from the configured certificate of the SeGW, or, alternatively, in step 307, the H(e)NB sends the certificate of the SeGW to the H(e)NB GW, and the H(e)NB GW obtains the public key of the SeGW from the received certificate.

In step 309, if the digital signature verification in step 308 is successful, the H(e)NB GW finishes the remaining registration procedures of the H(e)NB, and establishes a context for it; and the H(e)NB GW sends a registration response message to the H(e)NB; if the digital signature verification in step 308 is failed, the H(e)NB GW sends a registration failure message to the H(e)NB.

In step 310, when there is no HeNB GW deployed in the network, the HeNB registers in the MME. The HeNB sends a registration request message to the MME, and the message includes the digital signature and the identity information of the HeNB.

In step 311, the MME authorizes the identity information and the digital signature of the HeNB by a way which is the same as that in step 308.

In step 312, if the digital signature verification in step 311 is successful, the MME finishes the remaining registration procedures of the H(e)NB, and establishes a context for it; and the MME sends a registration response message to the H(e)NB; if the digital signature verification in step 308 is failed, the MME sends a registration failure message to the H(e)NB.

Embodiment Three

Figure 4:
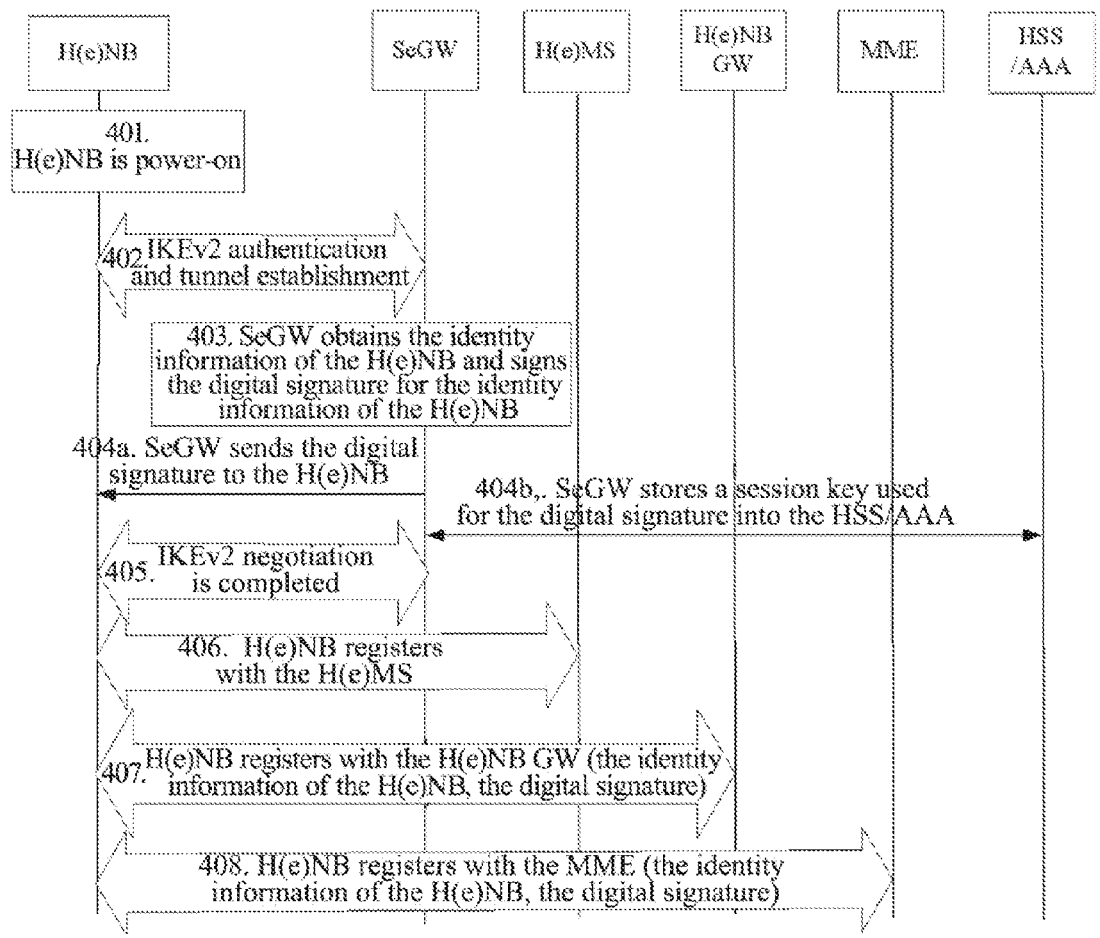
FIG. 4 is a flow chart of a Home (Evolved) NodeB (H(e)NB) security access method according to embodiment three of the present document.

FIG. 4 is a flow chart of a H(e)NB security access method according to embodiment three of the present document. The example is a method for the MME or the SGSN to verify the digital signature of the identify information of the H(e)NB when the UE registers. As shown in FIG. 4, the H(e)NB security access method of the example includes the following steps.

In step 401, the H(e)NB is power-on. The H(e)NB accesses the local network, and obtains the IP address configuration information from the local network.

In step 402, the H(e)NB initiates an IKEv2 negotiation with the SeGW. That process includes mutual-authentication of the H(e)NB and the SeGW, negotiation of the security association, the SeGW allocating an inner IP address to the H(e)NB, etc.

In step 403, the SeGW obtains the identity information of the H(e)NB used for the core network communication, and that information includes H(e)NB ID, and/or CSG ID, etc. The SeGW signs the digital signature for the identity information of the H(e)NB. When the digital signature is signed using the private key of the SeGW, the digital signature algorithm is referred to the algorithm shown in step 303. When the digital signature is signed using the dynamic session key, the following algorithm can be adopted:

a), X is calculated according to the formula [A] in step 303;

b), digital signature=Digital signature algorithm (X, dynamic session key).

Wherein, the dynamic session key is generated dynamically by the SeGW, for example, a string of random numbers, or generated by adopting other methods.

The present document does not stipulate the specific digital signature algorithm, the digital signature algorithm can refer to the current digital signature algorithm; for example, the digital signature algorithm can be an HASH algorithm with a key.

In step 404a, the SeGW sends the digital signature to the H(e)NB; alternatively, the SeGW can send the identity information of the H(e)NB together to the H(e)NB as well. If the identity information of the H(e)NB (such as CSG ID, H(e)NB ID) is not sent to the H(e)NB through the SeGW, the H(e)NB can obtain it from the H(e)MS or fixedly configure it on the H(e)NB. If the H(e)NB requires to be assigned with the IP address, the SeGW also sends the allocated IP address to the H(e)NB. The identity information of the H(e)NB and its digital signature can be sent by extending the IKEv2 protocol, for example, the Configuration Payload (CP) of the IKEv2 can be extended, to put the digital signature and the identity information of the H(e)NB into the Configuration Payload to send to the H(e)NB.

In step 404b, the SeGW stores the dynamic session key used for calculating the digital signature of the H(e)NB into the HSS/AAA.

In step 405, the IKEv2 negotiation is completed. The IPSec security tunnel is established between the H(e)NB and the SeGW.

In step 406, the H(e)NB obtains the configuration parameter from the H(e)MS.

In step 407, when the network deploys the H(e)NB GW, the H(e)NB sends a registration request message to the H(e)NB GW, and the H(e)NB sends the identity information of the H(e)NB and its digital signature to the H(e)NB GW in that message. The H(e)NB GW stores the digital signature and the identity information of the H(e)NB, and the IP address of the H(e)NB. The H(e)NB GW finishes the registration process of the H(e)NB, and sends a registration response to the H(e)NB.

In step 408, when there is no HeNB GW deployed in the network, the HeNB registers in the MME. The HeNB sends a registration request message to the MME, and the message includes the identity information of the HeNB and its digital signature. The MME stores the identity information of the H(e)NB, the digital signature and the IP address of the HeNB. The MME finishes the registration process of the H(e)NB, and sends a registration response to the H(e)NB.

Embodiment Four

Figure 5:
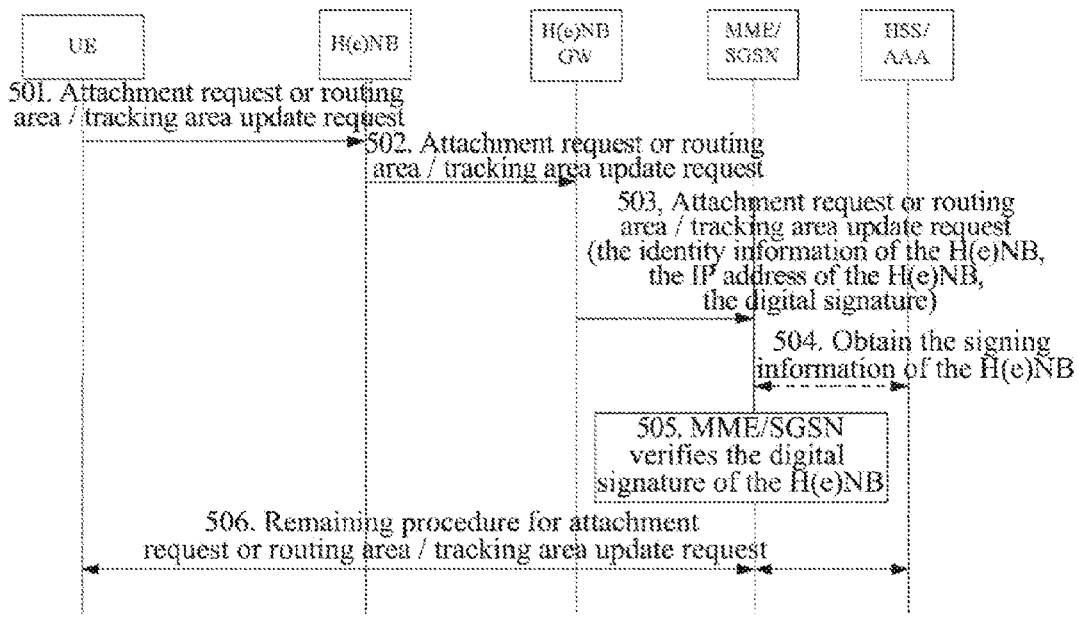
FIG. 5 is a flow chart of a Home (Evolved) NodeB (H(e)NB) security access method according to embodiment four of the present document.

FIG. 5 is a flow chart of a H(e)NB security access method according to embodiment four of the present document. The example is a method for the MME or the SGSN to verify the digital signature for the identify information of the H(e)NB when the UE registers. The present embodiment is the flow chart of the UE performing the attachment, routing, or tracking area updating through the H(e)NB. As shown in FIG. 5, the H(e)NB security access method in the example includes the following steps.

In step 501, when the UE is power-on under the H(e) NB or the UE moves into one H(e)NB located in a new routing area or tracking area, the UE sends an attachment request message or routing area/tracking area update request message to the H(e)NB.

In step 502, the H(e)NB forwards the above-mentioned UE registration request message through the S1 interface. When the H(e)NB GW is deployed, the message is sent to the H(e)NB GW; when the H(e)NB GW is not deployed, the message is sent to the MME directly. The H(e)NB GW judges whether the IP address of the H(e)NB is consistent to the IP address of the H(e)NB stored in its context. If inconsistent, the H(e)NB GW returns a failure message to the H(e)NB.

In step 503, when the H(e)NB GW is deployed, the H(e)NB GW forwards the message in step 502, and obtains the identity information of the H(e)NB, optionally, the IP address of the H(e)NB and/or the digital signature, from its context; and sends those messages together with the S1 message sent to the H(e)NB GW by the H(e)NB in step 502 to the SGSN (for GERAN or UTRAN) or MME (for EUTRAN). The H(e)NB GW stored the above-mentioned information in step 407.

In step 504, the MME/SGSN obtains the digital signature session key from the HSS/AAA according to the identity information of the H(e)NB received in step 503 (such as H(e)NB ID), and obtains other information of the H(e)NB from the HSS/AAA, for example, the CSG ID list supported by the H(e) NB; optionally, the HSS/AAA sends the key of the digital signature to the MME/SGSN.

In step 505, if the H(e)NB GW sends the digital signature to the MME/SGSN in step 503, the MME/SGSN verifies the digital signature of the H(e)NB.

When the digital signature is signed for the identity information of the H(e)NB using the public and private key, the verification algorithm refers to step 308. Wherein, the identity information of the H(e)NB, the IP address of the H(e)NB and the digital signature are sent to the MME/SGSN by the H(e)NB GW in step 503.

When the digital signature is signed for the identity information of the H(e)NB using the session key, the verification algorithm is as follows:

a). X' is calculated by formula [C] in step 308;
b). Y=Digital signature algorithm (X', session key).

If Y is the same with the digital signature received in step 502, then it is indicated that the verification is successful; otherwise, the verification is failed.

In step 506, the SGSN/MME triggers to finish the following UE attachment or routing area/tracking area update procedure, including the operation, such as, that the SGSN/MME judges whether to allow that UE to access the H(e)NB according to the CSG list supported by the H(e)NB and the CSG list subscribed by the UE, etc.

If the digital signature verification in step 505 is failed, the UE attachment procedure or the routing area/tracking area update procedure is failed and the flow ends.

Figure 6:
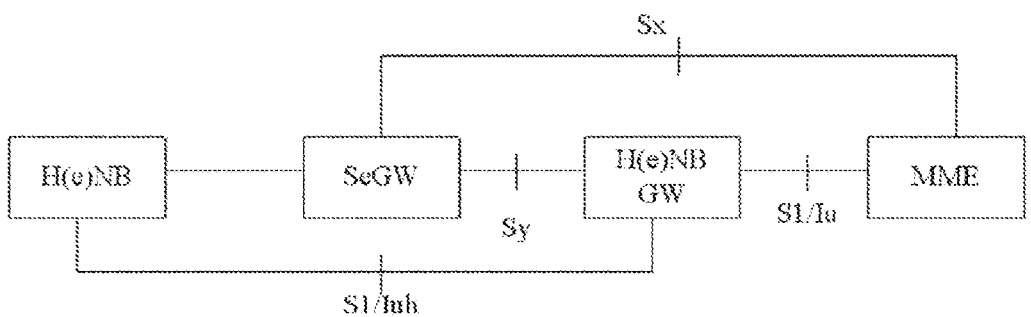
FIG. 6 is a structural composition diagram of a Home (Evolved) NodeB (H(e)NB) security access system according to an embodiment of the present document.

FIG. 6 is a structural composition diagram of a Home (Evolved) NodeB (H(e)NB) security access system according to an embodiment of the present document. The present example records another H(e)NB security access system for realizing the identity verification of the H(e)NB. Specifically, the communication interface is added between the SeGW and the MME, or the SGSN and the H(e)NB GW. After the MME or the H(e)NB GW receives the identity information sent by the H(e)NB, the MME/SGSN/H(e)NB GW sends the identity verification request message to the SeGW through that newly-added interface, thus the SeGW verifies whether the identity of the H(e)NB is true. As shown in FIG. 6, Sx and Sy are newly-added interfaces. The Sx interface is located between the MME and the SeGW, used for the MME to verify the identity of the H(e)NB, and that interface is only used in the scene that the H(e)NB GW is not deployed. The Sy interface is located between the H(e)NB GW and the SeGW, used for the H(e)NB GW to verify the identity of the H(e)NB. The present scheme is further described in detail by combining the flow chart hereinafter.

Embodiment Five

Figure 7:
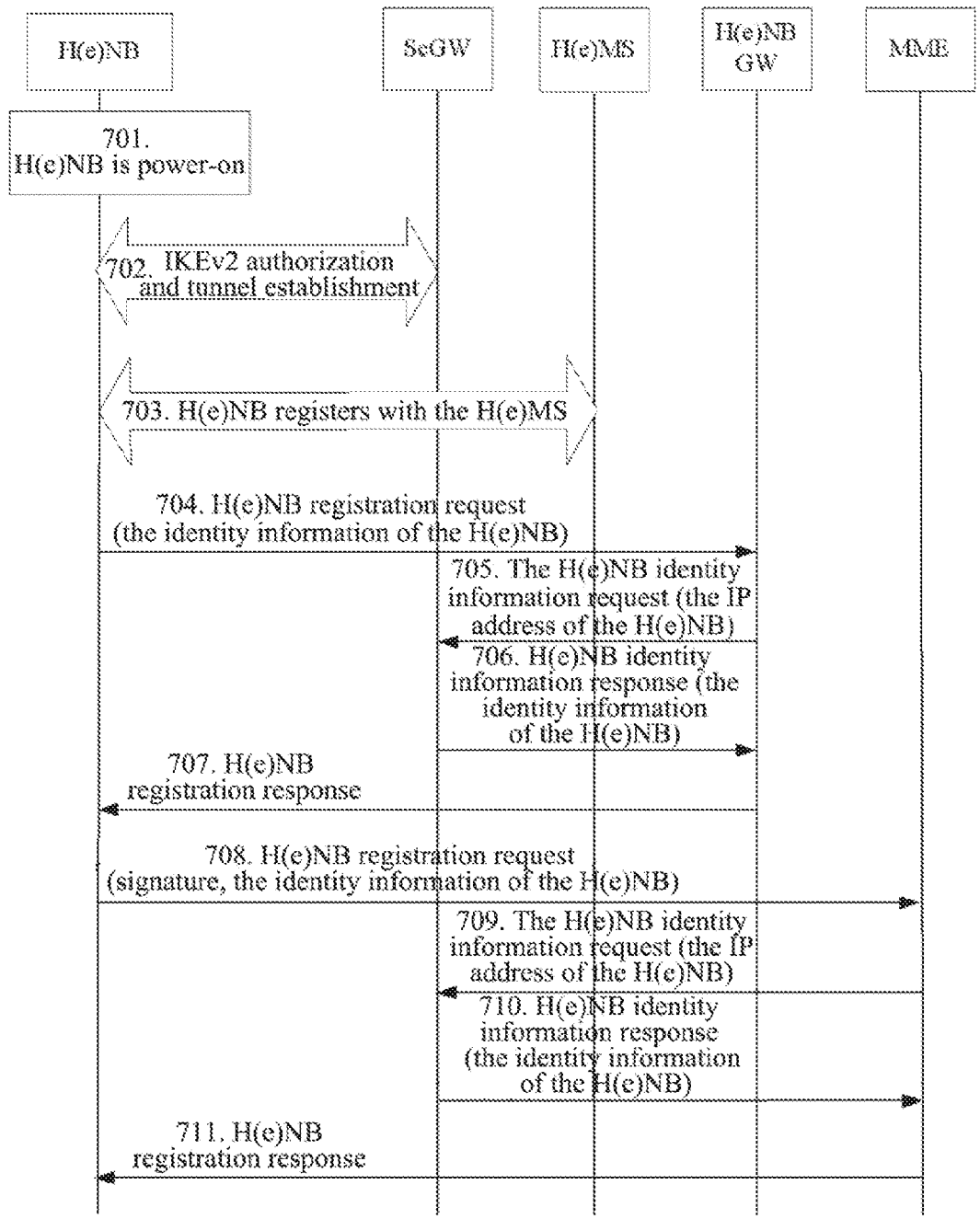
FIG. 7 is a flow chart of a Home (Evolved) NodeB (H(e)NB) security access method according to embodiment five of the present document.

FIG. 7 is a flow chart of a H(e)NB security access method according to embodiment four of the present document. The present embodiment is a flow chart of the power-on and registration of the H(e)NB. As shown in FIG. 7, the H(e)NB security access method of the example includes the following steps.

In step 701, the H(e)NB is power-on. The H(e)NB accesses the local network, and obtains the IP address configuration information from the local network.

In step 702, the H(e)NB initiates an IKEv2 negotiation with the SeGW. That process includes mutual-authentication of the H(e)NB and the SeGW, negotiation of the security association, the SeGW allocating an inner IP address for the H(e)NB, etc.

In step 703, the H(e)NB obtains the configuration parameter from the H(e)MS.

In step 704, the network deploys the H(e)NB GW, the H(e)NB sends a registration request message to the H(e)NB GW, and the H(e)NB sends the identity information of the H(e)NB to the H(e)NB GW in that message.

In step 705, in order to verify the identity of the H(e)NB, the H(e)NB GW sends the H(e)NB identity request message to the SeGW, and the message includes the IP address of the H(e)NB (that is, the IP address assigned to the H(e)NB by the SeGW).

In step 706, the SeGW inquires the identity information of the H(e)NB according to the IP address of the H(e)NB, and returns the identity information back to the H(e)NB GW.

In step 707, the H(e)NB GW stores the identity information of the H(e)NB, finishes the remaining registration procedures of the H(e)NB, and establishes a context for it; the H(e)NB GW sends the registration response message to the H(e)NB.

In step 708, when the network does not deploy the H(e)NB GW, the H(e)NB sends the registration request message to the MME, and the H(e)NB sends the identity information of the H(e)NB to the MME in that message.

In step 709, in order to verify the identity of the H(e)NB, the MME sends the H(e)NB identity request message to the SeGW, and the message includes the IP address of the H(e)NB (that is, the IP address assigned to the H(e)NB by the SeGW).

In step 710, the SeGW inquires the identity information of the H(e)NB according to the IP address of the H(e)NB, and returns the identity information back to the MME.

In step 711, the MME stores the identity information of the H(e)NB, finishes the remaining registration procedures of the H(e)NB, and establishes a context for it; the MME sends the registration response message to the H(e)NB.

The embodiments of the present document further provides an H(e)NB security access system, including a SeGW, an H(e)NB and a core network element; wherein:

the SeGW is configured to: sign a digital signature for identity information of the H(e)NB, and send the digital signature to the H(e)NB;

the H(e)NB is configured to: send the identity information of the H(e)NB and the digital signature to the core network element when the H(e)NB registers or UE attaches or tracking area updates or routing updates when accessing through the H(e)NB;

the core network element is configured to: perform a correctness verification on the digital signature and the identity information of the H(e)NB.

Wherein, the SeGW can use a private key of the SeGW to sign he identity information of the H(e)NB;

correspondingly, the core network element can perform the correctness verification on the digital signature and the identity information of the H(e)NB through a public key of the SeGW.

Wherein, the SeGW can use a dynamic session key to sign the identity information of the H(e)NB; and the SeGW can notify a home subscriber server (HSS)/Authentication, Authorization and Accounting (AAA)

server of the dynamic session key, and the HSS/AAA server stores the dynamic session key.

Wherein, the core network element can obtain, from the AAA/HSS, the dynamic session key for the digital signature for the identity information of the H(e)NB, and verify the identity information of the H(e)NB using the dynamic session key.

Wherein, the identity information of the H(e)NB can be an H(e)NB ID and an inner IP address of the H(e)NB, or is a Closed Subscribe Group (CSG) ID and an inner IP address of the H(e)NB, or is an H(e)NB ID, a CSG ID and an inner IP address of the H(e)NB; and the core network element can be a Mobility Management Entity (MME), a Serving GPRS Support Node (SGSN) or an H(e)NB GW.

A core network element of the embodiment of the present document is configured to:

receive identity information sent by a Home (evolved) NodeB (H(e)NB) and a digital signature of the identity information by a security gateway (SeGW), and perform a correctness verification on the identity information and the digital signature.

Another core network element of the embodiment of the present document is configured to: obtain identity information of a Home (evolved) NodeB (H(e)NB) performing identity authentication through a communication interface between the core network element and a security gateway (SeGW), perform a correctness verification on the identity information reported by the H(e)NB, and after the verification is passed, accept a registration of the H(e)NB.

Those skilled in the art should understand that the H(e)NB security system and the core network element in the present example can be understood, referring to the related description in the above-mentioned embodiments one to four.

It can be understood by those skilled in the art that all or part of steps in the above-mentioned method can be fulfilled by programs instructing the relevant hardware, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above description is only the preferred embodiments of the present document and is not intended to limit the present document. For those skilled in the art, the present document can have various modifications and variations. All of modifications, equivalents and/or variations which are made without departing from the spirit and essence of the present document should be embodied in the scope of the appended claims of the present document.

INDUSTRIAL APPLICABILITY

The solution of the embodiments of the present document avoids that the illegal H(e)NB registers with the core network element directly and realizes the accessing to the services of the UE, thereby maintaining network security.

What we claim is:

1. A Home (evolved) NodeB (H(e)NB) security access method, comprising:

signing by a security gateway (SeGW) a digital signature for identity information of the H(e)NB, and sending by the SeGW the digital signature to the H(e)NB;

sending by the H(e)NB a registration request containing the signed digital signature and the identity information of the H(e)NB to a core network element;

performing by the core network element a correctness verification on the digital signature and the identity information of the H(e)NB;

wherein the step of the signing by a security gateway (SeGW) a digital signature for identity information of the H(e)NB, and sending by the SeGW the digital signature to the H(e)NB comprises: obtaining by the SeGW the identity information and an IP address of the H(e)NB, and signing by the SeGW the digital signature based on the identity information and the IP address of the H(e)NB;

wherein the step of the performing by the core network element a correctness verification on the digital signature and the identity information of the H(e)NB comprises: obtaining by the core network element another digital signature based on received the identity information of the H(e)NB and a source IP address of the registration request, if the other digital signature is consistent with the digital signature received from the H(e)NB, determining that the correctness verification is passed, otherwise, determining that the correctness verification fails;

wherein the core network element is an H(e)NB GW or a Mobility Management Entity (MME), wherein, when a UE accesses through the H(e)NB, after the core network element verifies that the identity information of the H(e)NB is correct, sending the identity information of the H(e)NB by the core network element to the MME or SGSN or MSC, so that the MME or the SGSN or the MSC obtains the CSG ID information supported by the H(e)NB and performs an access control on the UE according to the CSG ID information;

wherein, the CSG ID information is obtained from the H(e)NB information, or the HSS/AAA server by the MME or the SGSN or the MSC.

2. The method according to claim 1, wherein the core network element is an MME, a Serving GPRS Support Node (SGSN) or a Mobile Switching Center (MSC), wherein, when the UE accesses through the H(e)NB, after the core network element verifies that the identity information of the H(e)NB is correct, obtaining by the core network element the CSG ID information supported by the H(e)NB, and performing by the core network element an access control on the UE according to the CSG ID information; wherein, the CSG ID information is obtained from the H(e)NB information, or from the HSS/AAA server by the core network element.

3. The method according to claim 1, wherein, using by the SeGW a private key of the SeGW to sign the digital signature for the identity information of the H(e)NB;

performing by the core network element the correctness verification on the digital signature and the identity information of the H(e)NB through a public key of the SeGW, wherein, the public key of the SeGW is obtained by the core network element from a configured certificate of the SeGW, or a certificate sent from the H(e)NB to the core network element.

4. The method according to claim 1, wherein, using, by the SeGW a dynamic session key to sign the digital signature for the identity information of the H(e)NB; and the method further comprises: notifying by the SeGW a home subscriber server (HSS)/Authentication, Authorization and Accounting (AAA) server of the dynamic session key, and storing by the HSS/AAA server the dynamic session key, wherein the step of the performing by the core network element a correctness verification on the digital signature and the identity information of the H(e)NB comprises:

obtaining by the core network element, from the AAA/HSS, a temporary session key for signature for the identity information of the H(e)NB, and performing the verification on the identity information of the H(e)NB using the temporary session key.

5. The method according to claim 1, wherein, the identity information of the H(e)NB is an H(e)NB ID, or is a Closed Subscribe Group (CSG) ID, or is an H(e)NB ID, a CSG ID.

6. The method according to claim 1, further comprising: after the verification for the H(e)NB information and the digital signature by the core network element is successful, storing by the core network element the H(e)NB information.

7. The method according to claim 1, wherein, a configuration payload (CP) of IKEv2 is extended for sending by the SeGW the digital signature and the identity information of the H(e)NB to the H(e)NB.

8. The method according to claim 7, wherein the method further comprises: sending by the SeGW the identity information of the H(e)NB to the H(e)NB.

9. A Home (evolved) NodeB (H(e)NB) security access system, comprising a security gateway (SeGW) and a core network element;

wherein, the SeGW is configured to: sign a digital signature for identity information of the H(e)NB, and send the digital signature of the H(e)NB to the H(e)NB;

the core network element is configured to: receive a registration request containing the signed digital signature and the identity information of the H(e)NB sent by the H(e)NB, and perform a correctness verification on the identity information and the digital signature;

wherein the SeGW is further configured to: obtain the identity information and an IP address of the H(e)NB, and sign the digital signature based on the identity information and the IP address of the H(e)NB;

wherein the core network element is further configured to: obtain an other digital signature based on received the identity information of the H(e)NB and a source IP address of the registration request, if the other digital signature is consistent with the digital signature received from the H(e)NB, determine that the correctness verification is passed, otherwise, determine that the correctness verification fails;

wherein the core network element is an H(e)NB GW or a Mobility Management Entity (MME), wherein the core network element is further configured to: when a UE accesses through the H(e)NB, after verifying that the identity information of the H(e)NB is correct, send the identity information of the H(e)NB to the MME or SGSN or MSC, so that the MME or the SGSN or the MSC obtains the CSG ID information supported by the H(e)NB and performs an access control on the UE according to the CSG ID information; wherein, the CSG ID information is obtained from the H(e)NB information, or the HSS/AAA server by the MME or the SGSN or the MSC.

10. The system according to claim 9, wherein, the SeGW is configured to use a private key of the SeGW to sign the digital signature for the identity information of the H(e)NB;

the core network element is configured to perform the correctness verification on the digital signature and the identity information of the H(e)NB through a public key of the SeGW.

11. The system according to claim 9, wherein, the SeGW is configured to use a dynamic session key to sign the digital signature for the identity information of the H(e)NB; and notify a home subscriber server (HSS)/Authentication, Authorization and Accounting (AAA) server of the dynamic session key.

12. The system according to claim 11, wherein, the core network element is configured to: obtain, from the AAA/HSS, a temporary session key for the digital signature for the identity information of the H(e)NB, and verify the identity information of the H(e)NB using the temporary session key.

13. The system according to claim 9, wherein, the identity information of the H(e)NB is an H(e)NB ID, or is a Closed Subscribe Group (CSG) ID.

14. The system according to claim 9, wherein, the SeGW is configured to send the identity information of the H(e)NB to the H(e)NB.

15. A core network element, configured to:

receive a registration request containing a digital signature signed by a security gateway (SeGW) and identity information of a H(e)NB sent by the H(e)NB, and perform a correctness verification on the identity information and the digital signature;

wherein the core network element is further configured to: obtain an other digital signature based on received the identity information of the H(e)NB and a source IP address of the registration request, if the other digital signature is consistent with the digital signature received from the H(e)NB, determine that the correctness verification is passed, otherwise, determine that the correctness verification fails;

wherein the core network element is an H(e)NB GW or a Mobility Management Entity (MME), wherein the core network element is further configured to: when a UE accesses through the H(e)NB, after verifying that the identity information of the H(e)NB is correct, send the identity information of the H(e)NB to the MME or SGSN or MSC, so that the MME or the SGSN or the MSC obtains the CSG ID information supported by the H(e)NB and performs an access control on the UE according to the CSG ID information;

wherein, the CSG ID information is obtained from the H(e)NB information, or the HSS/AAA server by the MME or the SGSN or the MSC.

* * * * *